UNITED STATES PATENT OFFICE.

CHARLES B. COXE, OF CARLTON, MINNESOTA.

PROCESS OF MANUFACTURING BRICK OR TILE.

No. 795,488.　　　　　Specification of Letters Patent.　　　　　Patented July 25, 1905.

Application filed May 18, 1905. Serial No. 261,065.

*To all whom it may concern:*

Be it known that I, CHARLES B. COXE, a citizen of the United States, residing at Carlton, in the county of Carlton and State of Minnesota, have invented certain new and useful Improvements in Processes of Manufacturing Brick or Tile; and I do hereby declare the following to be a full, clear, and exact description of the invention, such as will enable others skilled in the art to which it appertains to make and use the same.

My invention relates to and has for its object an improved process of manufacturing brick or tile whereby the usually necessary burning may be avoided and a durable brick containing a very large and evenly-distributed proportion of sand or substitute therefor may be finished at comparatively small expense.

My process consists in thoroughly mixing together in a dry condition a large proportion of granulated or powdered slate, rock, or sand, or equivalent body material and a very small proportion of dry Portland cement or equivalent cementitious material; then very slightly dampening or moistening the mixture by spraying or by subjecting the same to a suitable vapor, as steam, but not sufficiently to bind the particles together without pressure; then subjecting the compound in molds to great pressure; then removing the resulting bricks and storing them for a period of from thirty-six to forty-eight hours in a damp or moist envelop or environment. In making such bricks or tile the use for which they are intended will to some extent govern the proportions of the dry component parts thereof; but by my process I am enabled to make bricks containing a much smaller percentage of water and cement than is necessary in the making of concrete or artificial stone for the same purposes by the usual method of tamping the compound in molds with manually-operated mauls. By my process I also avoid the necessity for burning the bricks which exists in the manufacture of so-called "dry-clay" bricks. The proportion of cement to sand in durable bricks made by my process may be about five hundred per cent. less than in concrete bricks or stones of uniform mixture and equal size, strength, and shape made by the usual tamping process.

In manufacturing brick or tile by my process the proper form and pressure may, however, be given them by any suitable molding-press—such as is used for making brick by the so-called "dry-clay" process—as, for example, the commercially-known "Boyd brick-press" or by the mechanism disclosed in the United States Letters Patent No. 521,535, dated June 19, 1894, issued to me for improvements in the manufacture of bricks. In practice I prefer to use from six to ten thousand pounds pressure per square inch upon said compound in the mold, and it is obvious that if the compound were not nearly dry in the mold the excessive moisture would prevent the desired packing together of the mineral elements of the brick in the close association requisite when so small a proportion of cement is used with so large a proportion of sand or slate or equivalent.

One purpose of storing the brick in a moist environment after molding is that should they have been too dry in the mold they may absorb enough moisture to thoroughly set the cement. Another reason is that the cement may have time to set before the brick is completely dried.

I am aware that cement and sand or its equivalent have been mixed dry and then wet down and molded into stone or brick by tamping in molds, and I am aware of the so-called "dry" process of forming a pressing-clay brick which are afterward burned.

What I claim, and desire to secure by Letters Patent, is—

The process or method of making bricks, or tile, which consists of mixing dry sand or granulated or powdered slate or their equivalent with a very small proportion of dry cement and then very slightly dampening the compound but not sufficiently to cause the bulk of the component mineral particles to adhere to each other without pressure, and then subjecting it in molds to a pressure of upward of five thousand pounds per square inch of brick area, and then storing the bricks so formed in a moist environment for upward of thirty-six hours, substantially as described.

In testimony whereof I hereunto affix my signature in presence of two witnesses.

CHARLES B. COXE.

Witnesses:
　JAMES T. WATSON,
　AUDEN JOHNSON.